United States Patent
Jang et al.

(10) Patent No.: US 12,506,196 B2
(45) Date of Patent: Dec. 23, 2025

(54) BATTERY PACK AND DEVICE INCLUDING THE SAME

(71) Applicant: LG ENERGY SOLUTION, LTD., Seoul (KR)

(72) Inventors: Sunghwan Jang, Daejeon (KR); Junyeob Seong, Daejeon (KR); Hyemi Jung, Daejeon (KR); Won Kyoung Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 861 days.

(21) Appl. No.: 17/743,513

(22) Filed: May 13, 2022

(65) Prior Publication Data

US 2022/0393266 A1     Dec. 8, 2022

(30) Foreign Application Priority Data

Jun. 2, 2021   (KR) .................. 10-2021-0071443

(51) Int. Cl.
*H01M 10/658*     (2014.01)
*H01M 10/653*     (2014.01)
*H01M 50/24*      (2021.01)

(52) U.S. Cl.
CPC ....... *H01M 10/658* (2015.04); *H01M 10/653* (2015.04); *H01M 50/24* (2021.01); *H01M 2220/20* (2013.01)

(58) Field of Classification Search
CPC .. H01M 10/658; H01M 10/653; H01M 50/24; H01M 2220/20; H01M 10/647; H01M 50/211; Y02E 60/10
See application file for complete search history.

(56) References Cited

U.S. PATENT DOCUMENTS

| | | | |
|---|---|---|---|
| 2008/0020270 A1 | 1/2008 | Park et al. | |
| 2013/0017422 A1* | 1/2013 | Bae | H01M 50/209 |
| | | | 429/82 |
| 2014/0117271 A1* | 5/2014 | Plaver | C08J 9/0038 |
| | | | 252/62 |
| 2021/0328284 A1 | 10/2021 | Kim | |
| 2022/0017745 A1 | 1/2022 | Park et al. | |
| 2022/0231352 A1* | 7/2022 | Xiang | H01M 10/653 |

FOREIGN PATENT DOCUMENTS

| | | | |
|---|---|---|---|
| JP | 2019172762 A | * | 10/2019 |
| JP | 2021-2420 A | | 1/2021 |
| KR | 10-2008-0007693 A | | 1/2008 |
| KR | 20080007693 A | * | 1/2008 |
| KR | 10-1275813 B1 | | 6/2013 |
| KR | 10-2018-0071800 A | | 6/2018 |
| KR | 10-2018-0103263 A | | 9/2018 |
| KR | 10-1917279 B1 | | 11/2018 |
| KR | 10-2020-0086907 A | | 7/2020 |
| KR | 10-2020-0114001 A | | 10/2020 |
| KR | 10-2218858 B1 | | 2/2021 |

* cited by examiner

*Primary Examiner* — Muhammad S Siddiquee
(74) *Attorney, Agent, or Firm* — Birch, Stewart, Kolasch & Birch, LLP

(57) ABSTRACT

A battery pack includes a battery module including a battery cell stack in which a plurality of battery cells are stacked and a module frame for housing the battery cell stack, and a pack frame for housing the battery module, wherein an empty space between the battery module and the pack frame and/or an empty space between the battery modules are sealed by a filling member, and wherein the filling member is in contact with the battery module and the pack frame.

15 Claims, 6 Drawing Sheets

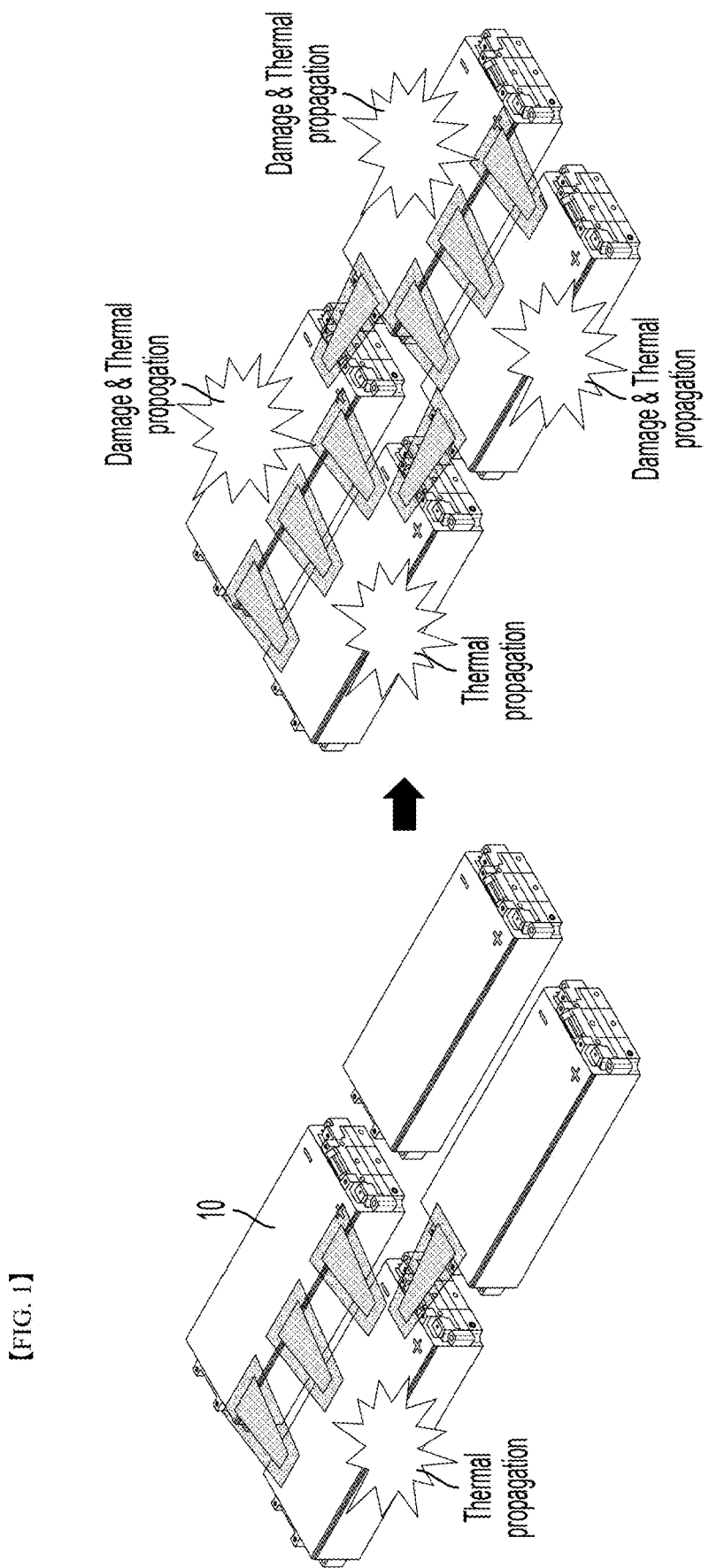
[FIG. 1]

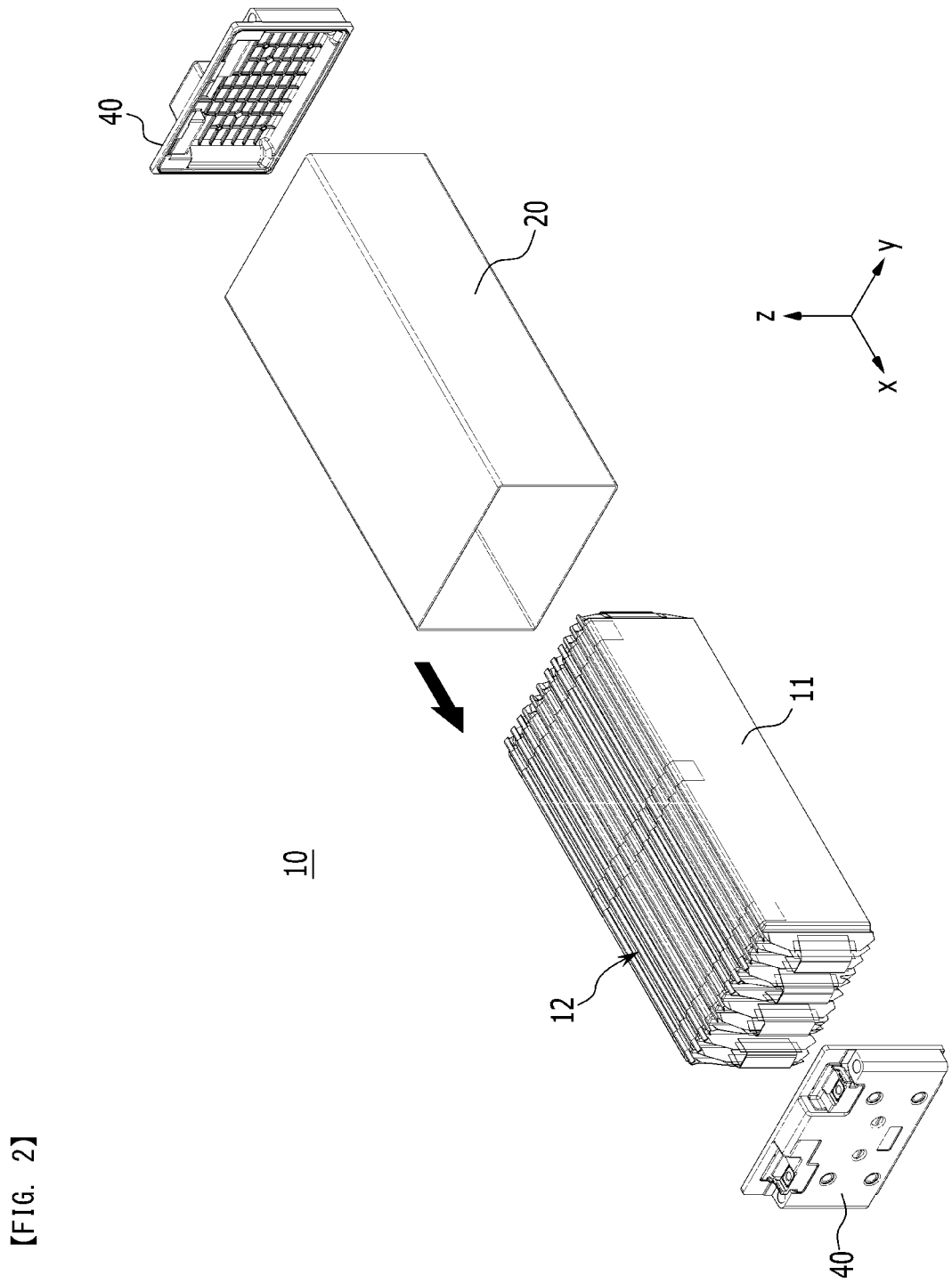
[FIG. 2]

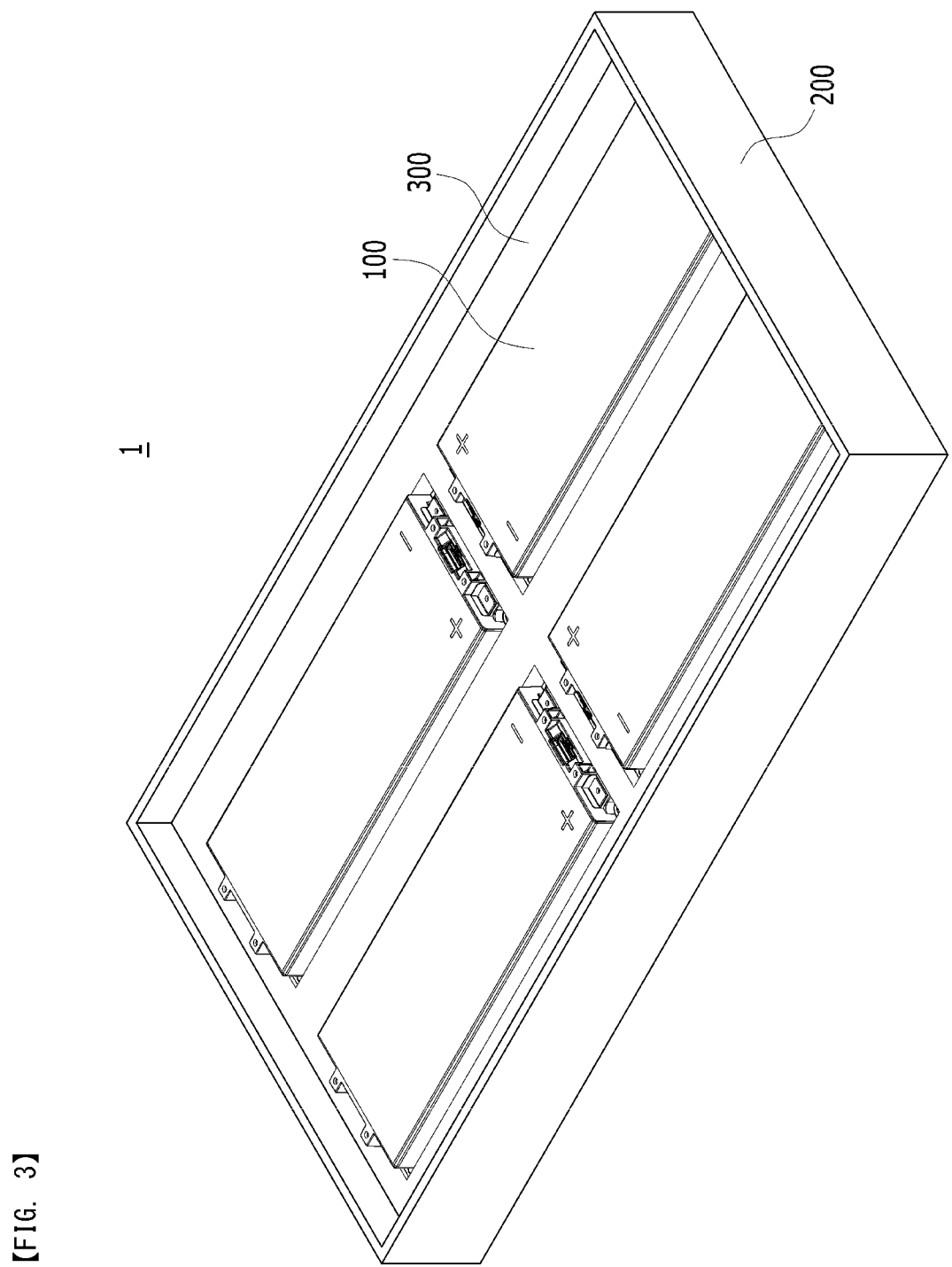
[FIG. 3]

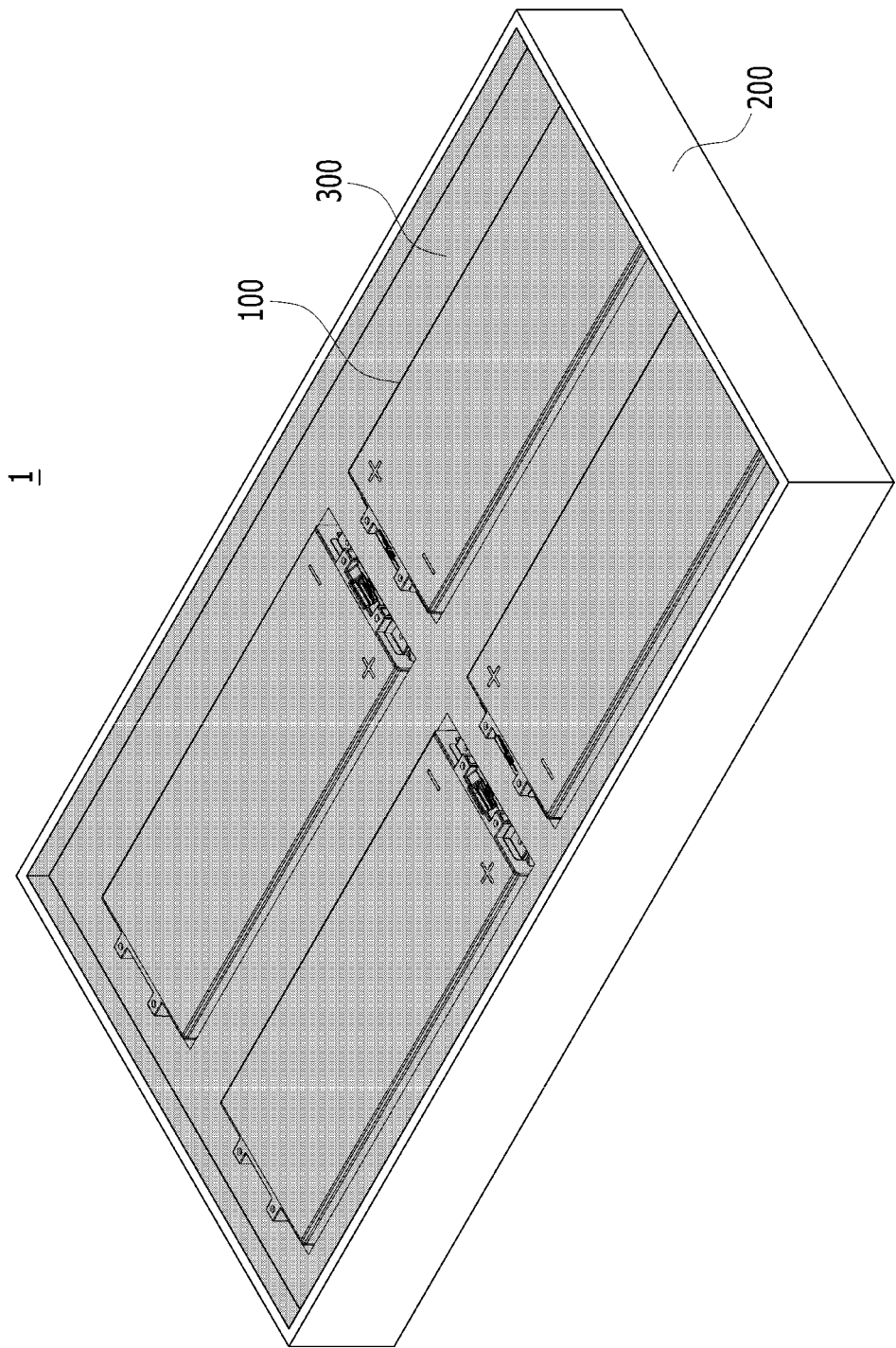
[FIG. 4]

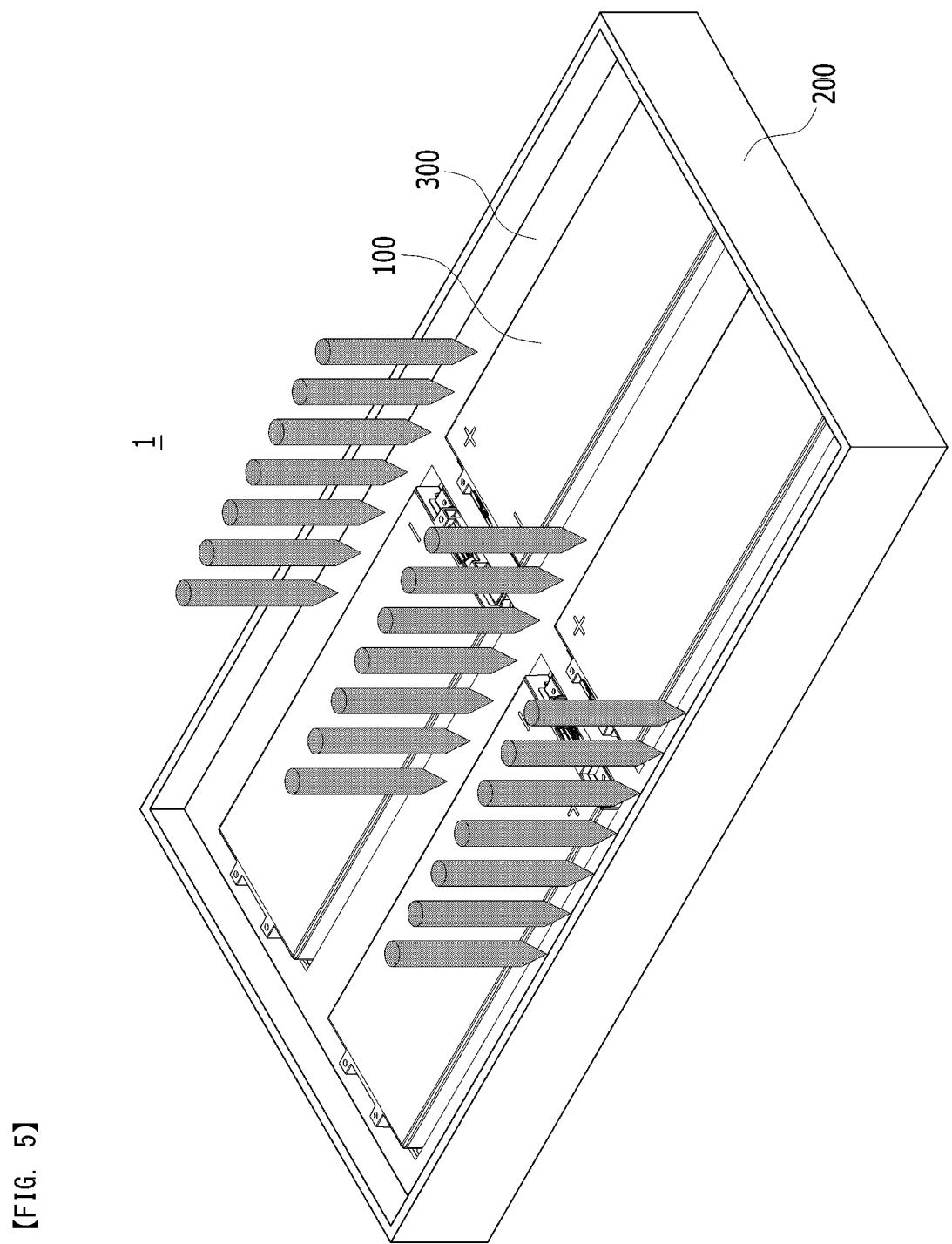
[FIG. 5]

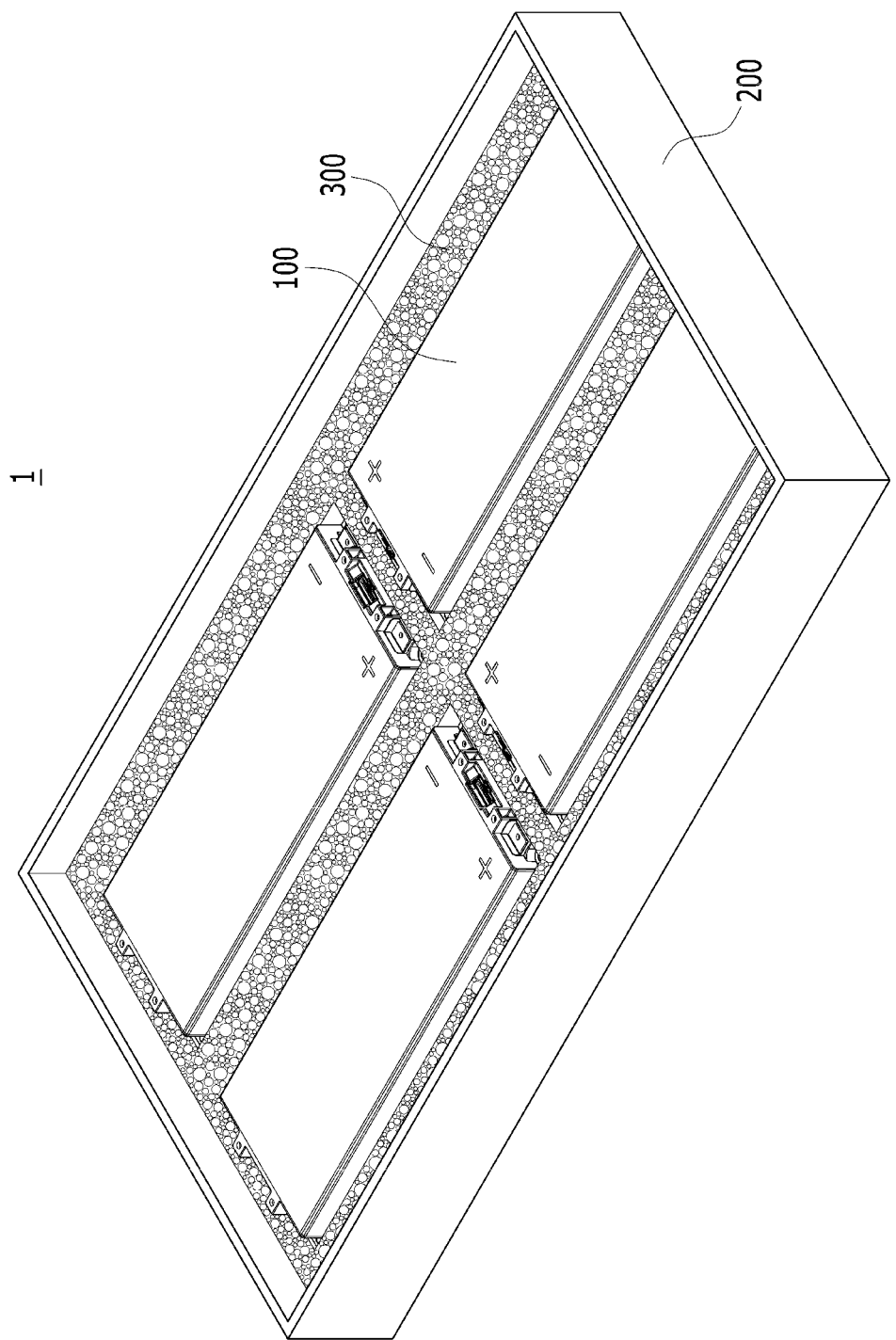
[FIG. 6]

BATTERY PACK AND DEVICE INCLUDING THE SAME

TECHNICAL FIELD

The present disclosure relates to a battery pack and a device including the same, and more particularly to a battery pack having enhanced stability and a device including the same.

BACKGROUND

In modern society, as portable devices such as a mobile phone, a notebook computer, a camcorder and a digital camera has been daily used, the development of technologies in the fields related to mobile devices as described above has been activated. In addition, chargeable/dischargeable secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel. Therefore, there is a growing need for development of the secondary battery.

Currently commercialized secondary batteries include a nickel cadmium battery, a nickel hydrogen battery, a nickel zinc battery, a lithium secondary battery, and the like. Among them, the lithium secondary battery has come into the spotlight because they have advantages, for example, being freely charged and discharged, and having very low self-discharge rate and high energy density.

Meanwhile, in the case of a secondary battery used for small-sized devices, two to three battery cells are used, but in the case of a secondary battery used for a middle or large-sized device such as an automobile, a battery module in which a large number of battery cells are electrically connected is used. Unlike secondary batteries used in small-sized devices, secondary batteries used in medium and large-sided devices, a large number of battery cells are connected in series or parallel to each other to form a battery cell stack, thereby improving capacity and output, but there is a problem that heat generated from a plurality of battery cells is added up in a narrow space within the battery module, so that the overall temperature can be increased more rapidly.

FIG. 1 is a view showing the state at the time of ignition of the battery module mounted on a battery pack, and FIG. 2 is an exploded perspective view of a battery module mounted on a battery pack.

Referring to FIGS. 1 and 2, at least one battery module 10 can be mounted onto the battery pack, and the battery module 10 may include a battery cell stack 12 in which a plurality of battery cells 11 are stacked, a frame 20 for housing the battery cell stack 12, end plates 40 formed on the front and rear surfaces of the battery cell stack 12, a terminal busbar 50 formed to protrude outside the end plate, and the like.

The battery cell 11 mounted onto the battery module 10 may generate a large amount of heat in the charge and discharge process. If the temperature becomes higher than an appropriate temperature due to overcharging or the like, the performance may deteriorate. If the temperature rise is excessive, there is a risk of explosion or ignition. When an ignition phenomenon occurs inside the battery module 10, high-temperature heat, gas, or flame may be emitted to the outside of the battery module 10. At this time, heat, gas, sparks or flames emitted from one battery module 10 may be transferred to another battery module 10 adjacent to each other at a narrow interval, which may lead to a continuous thermal runaway phenomenon within the battery pack.

Therefore, when a thermal runaway phenomenon occurs in the battery module 10, there is a need for the internal design of a battery pack that prevents the transfer of heat, gas, or flame between a plurality of battery modules 10 and thereby prevents a chain thermal runaway phenomenon.

DETAILED DESCRIPTION OF THE INVENTION

Technical Problem

It is an object of the present disclosure to provide a battery pack having improved durability and safety by preventing continuous thermal runaway, and a device including the same. However, the problem to be solved by the embodiments of the present disclosure is not limited to the above-described problems, and can be variously expanded within the scope of the technical idea included in the present disclosure.

Technical Solution

According to one aspect of the present disclosure, there is provided a battery pack comprising: at least one battery module including a battery cell stack in which a plurality of battery cells are stacked and a module frame for housing the battery cell stack, and a pack frame for housing the at least one battery module, wherein an empty space between the at least one battery module and the pack frame and/or an empty space between the battery modules are sealed by a filling member, and wherein the filling member is in contact with the at least one battery module and the pack frame.

The at least one battery module is a first battery module and a second battery module, the filling member is formed in a separated space between the first battery module and the second battery module, and the filling member may be in contact with each of the battery modules.

The filling member may include a thermal conductive material.

The filling member may include a flame-retardant material.

The filling member may include an insulating material.

The filling member may be formed of a material that is decomposed by an endothermic reaction.

The filling member may have a non-porous structure.

The filling member may have a porous structure.

The filling member may be made of a flame-retardant foam.

The filling member may be made of a polyurethane foam.

The filling member may be made of a polyurethane foam to which expanded graphite is added.

According to another aspect of the present disclosure, there is provided a device comprising the above-mentioned battery pack.

A height of the at least one battery module may be greater than a height of the filling member.

A height of the at least one battery module may be less than a height of the filling member.

Advantageous Effects

According to embodiments of the present disclosure, by sealing the empty space in the battery pack, a thermal runaway phenomenon generated in one battery module can be prevented from propagating to an adjacent battery module.

The effects of the present disclosure are not limited to the effects mentioned above and additional other effects not described above will be clearly understood from the detailed description of the appended claims by those skilled in the art.

BRIEF DESCRIPTION OF THE DRAWINGS

FIG. 1 is a view showing the state at the time of ignition of the battery module mounted on a battery pack;

FIG. 2 is an exploded perspective view of a battery module mounted on a battery pack;

FIG. 3 is a perspective view showing the inside of a battery pack according to an embodiment of the present disclosure;

FIG. 4 is another perspective view showing the inside of a battery pack according to an embodiment of the present disclosure;

FIG. 5 is a view for explaining an example of a filling member included in a battery pack according to an embodiment of the present disclosure; and FIG. 6 is a view for explaining another example of a filling member included in a battery pack according to an embodiment of the present disclosure.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways other than those described below, and is not limited to the embodiments set forth herein.

Portions that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed "on" or "above" the reference portion toward the opposite direction of gravity. Meanwhile, similar to the case where it is described as being located "on" or "above" another part, the case where it is described as being located "below" or "under" another part will also be understood with reference to the above-mentioned contents.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

Now, the battery pack according to an embodiment of the present disclosure will be described. FIG. 3 is a perspective view showing the inside of a battery pack according to an embodiment of the present disclosure. FIG. 4 is another perspective view showing the inside of a battery pack according to an embodiment of the present disclosure.

Referring to FIGS. 3 and 4, a battery pack 1 according to an embodiment of the present disclosure may include at least one battery module 100, a pack frame 200 for housing the at least one battery module 100, and a filling member 300 that fills a separated space within the pack frame 200.

The battery module 100 according to the present embodiment may include a battery cell stack in which a plurality of battery cells are stacked in one direction, a module frame for housing the battery cell stack, a busbar frame located on the front surface and/or the rear surface of the battery cell stack, end plates for covering the front surface and/or the rear surface of the busbar frame. busbars and/or sensing units mounted on busbar frames, and the like. However, the components included in the battery module 100 are not limited thereto, and depending on the design, the battery module 100 may be provided in a state in which a part of the above-mentioned components are omitted, and may be provided in a state in which other components not mentioned are added.

The type of battery cell included in the battery module 100 according to the present embodiment is not particularly limited, and all cylindrical battery cells of pouch type, prismatic type, or jelly roll type can be applied.

The module frame included in the battery module 100 according to the present embodiment may include a metal having high thermal conductivity. Examples of the metal may be aluminum, gold, silver, copper, platinum or an alloy containing these. As the thermal conductivity of the metal is higher, the heat dissipation effect by the module frame is improved. Thus, there is no special range for the thermal conductivity value.

The battery module 100 included in the battery pack according to the present embodiment may be formed by a plurality of numbers. The plurality of battery modules 100 may be arranged in rows and columns within the pack frame 200. In FIG. 3, four battery modules 100 are shown to be arranged in 2 columns and 2 rows, but this is not always the case. The plurality of battery modules 100 may be arranged in a plurality of columns or a plurality of rows inside the pack frame 200. Here, the 'row' may mean a set of battery modules 100 arranged in one direction, and the 'column' may mean a set of battery modules 100 arranged in a direction perpendicular to the one direction. For example, the battery modules 100 may be arranged along the longitudinal direction of the battery cell stack included in the battery module 100 to form one row. Further, the battery modules 100 may be arranged along the stacking direction of the battery cell stack to form one column.

The pack frame 200 according to the present embodiment can be for protecting the battery module 100 and electrical equipment connected thereto from external physical impacts. The pack frame 200 may include a lower frame including a lower surface (bottom surface) and a side surface. After the battery modules 100 are arranged in the inner space of the lower frame formed from the lower surface and the side surface, the upper plate or the upper frame is combined with the corners of the lower frame, so that the pack frame 200 can be sealed. Here, the upper plate or upper frame may be included in the pack frame 200, or may be a separate configuration not included in the pack frame 200.

The pack frame 200 may include a portion having high thermal conductivity in order to rapidly dissipate heat generated in the inner space to the outside. For example, at least a part of the pack frame 200 may be made of a metal having high thermal conductivity, and examples thereof may be aluminum, gold, silver, copper, platinum, or an alloy including these. Further, the pack frame 200 may have a partial electrical insulation property, and an insulating film may be provided at a position where insulation is required, or an insulating coating may be applied. A portion of the pack frame 200 to which an insulating film or insulating coating is applied may be referred to as an insulating portion.

Meanwhile, an empty space may exist inside the pack frame 200 in which the battery module 100 is located, and when an ignition phenomenon occurs inside the battery module 100, there is a problem that heat, gas, sparks, or flames generated in one battery module 100 are transferred to another battery module 100 through such an empty space. Therefore, in order to solve these problems, the battery pack 1 according to an embodiment of the present disclosure may be provided with a filling member 300 for sealing the empty space inside the pack frame 200.

Referring to FIGS. 3 and 4 again, the filling member 300 according to the present embodiment may be formed in an empty space between the pack frame 200 and the battery module 100 and an empty space between the battery modules 100. The filling member 300 fills the empty space inside the pack frame 200, whereby gas, sparks, etc. generated from one battery module 100 can be prevented from being transmitted to another adjacent battery module 100.

The filling member 300 may provide a heat transferring passage. The filling member 300 may replace an air layer or an air pocket in the pack frame 200. The filling member 300 may be in contact with the battery module 100. The filling member 300 may be in contact with the pack frame 200. The filling member 300 may be in surface contact with the battery module 100 or the pack frame 200. At least a part of the battery module 100 and/or the pack frame 200 may be made of a metal having excellent thermal conductivity, and the filling member 300 is in contact with the battery module 100 and the pack frame 200, whereby heat generated from the battery module 100 can be discharged to the pack frame 200 and to the outside of the pack frame 200. When a cooling member is present inside and outside the pack frame 200, the heat generated in the battery module 100 may be transferred to the cooling member through the filling member 300, so that heat dissipation of the battery pack 1 may be more quickly and effectively achieved through the filling member 300.

The filling member 300 may include a thermal conductive material. The filling member 300 may include a thermal interface material (TIM). The heat dissipation interface material may be a heat transfer material having a lower heat resistance than air. The filling member 300 provided as a thermal conductive material is in contact with the battery module 100, so that heat generated in the battery module 100 can be rapidly discharged to the outside.

The filling member 300 may include a flame-retardant material, that is, a flame retardant. The filling member 300 having a flame retardancy can minimize its damage even at the time of internal ignition of the battery module 100, and thus, can improve the durability of the battery pack 1.

Examples of the flame retardant include phosphorus-based, nitrogen-based, inorganic-based materials, and the like. Specific examples of the flame retardant include silicone (including silicone foam), urethane-based material (including urethane foam), polyurethane-based material (including polyurethane foam), fluorine-based material, and the like. The flame-retardant materials that the filling member 300 can include are not limited by the above-mentioned examples, and can include various materials other than those mentioned.

The filling member 300 may include an insulating material. The filling member 300 having insulation properties may electrically insulate between the battery modules 100 or between the battery module 100 and the pack frame 200, whereby the safety of the battery pack 1 can be improved. Examples of the insulating material include silicone (including silicone foam), urethane-based material (including urethane foam), polyurethane-based material (including polyurethane foam), and fluorine-based material, and the like. The insulating material that the filling member 300 can include is not limited thereto.

The filling member 300 may include a material for alleviating an ignition phenomenon at the time of internal ignition of the battery module 100. The filling member 300 may include a self-extinguishing material. The filling member 300 may include a thermal decomposable material. The filling member 300 may absorb heat generated in the battery module by performing a thermal decomposition reaction that is an endothermic reaction. Further, the filling member 300 may generate water vapor or the like through a thermal decomposition reaction upon internal ignition of the battery module 100, and the generated water vapor can suppress the flame by suppressing a fire or preventing external oxygen from flowing into the battery module 100. Thereby, the flame and heat propagation speed inside the battery pack 1 can be effectively delayed and the safety of to the battery pack 1 can be improved. An example of the self-extinguishing material may be polyurethane, and various self-extinguishing materials not mentioned herein can be used for the filling member 300.

Further, the filling member 300 may be provided of a heat insulating material, so that heat transfer between the battery modules 100 may be minimized. Examples of the insulating material provided to the filling member 300 include urethane-based (including urethane foam), polyurethane-based (including polyurethane foam), polystyrene (including expanded polystyrene or Styrofoam), polyethylene, cellulose, phenol resins (including phenolic foam), and the like, and the insulating material that the filling member 300 can include is not limited thereto.

In this manner, the filling member 300 may be made of a material having various physical properties and provided, and it can be provided as a material including a plurality of physical properties or a composite of materials including each physical property. For example, the filling member 300 may include a thermal conductive flame retardant. As another example, the filling member 300 may include a thermal conductive insulating material.

The form of the filling member 300 is not fixed, and the form may change depending on the inner space of the battery pack 1 and the spacing between the battery modules 100. Further, as shown in FIG. 3, the filling member 300 may be formed so that a part of the battery module 100 is impregnated (submerged) in the filling member 300, and as shown in FIG. 4, it may be formed such that the entirety of the battery module 100 is impregnated (submerged) in the filling member 300. When the filling member 300 is provided in the form as shown in FIG. 4, the outer surface of the battery module 100 may be sealed by being surrounded by the filling member 300 as a whole, and the effect of preventing heat propagation by the filling member 300 can be maximized.

FIG. 5 is a view for explaining an example of a filling member included in a battery pack according to an embodiment of the present disclosure.

Referring to FIG. 5, the filling member 300 according to the present embodiment may be formed by curing a material in a liquid state. For example, the filling member 300 may be formed by curing a resin. More specifically, after the battery modules 100 are disposed inside the pack frame 200, a resin in a liquid state is applied, and the applied resin can be cured to form the filling member 300. Here, the resin in a liquid state may be applied before the upper frame or the upper plate is coupled to the lower frame as shown in FIG. 5. Further, the resin in a liquid state may be injected through one or more injection holes formed in the pack frame 200 after the frames are combined, unlike that shown in FIG. 5.

Meanwhile, the filling member 300 may be provided in a non-porous structure having a high density, that is, containing no voids, but it may be provided in a porous structure containing pores.

FIG. 6 is a view for explaining another example of a filling member included in a battery pack according to an embodiment of the present disclosure.

Referring to FIG. 6, the filling member 300 can be provided to have a porous structure.

The filling member 300 includes a plurality of pores, and thus can minimize the overall weight. The filling member 300 filling the empty space inside the battery pack 1 may increase the overall weight of the battery pack 1. However, the filling member 300 provided in the porous structure may have a small weight compared to the filling member 300 provided in the non-porous structure, whereby the weight reduction of the battery pack 1 can be achieved.

As the filling member 300 includes a plurality of voids, the heat insulating performance of the filling member 300 can be improved. At this time, the heat insulating performance of the filling member 300 can be improved as the size of the pores decreases, the size of the pores becomes uniform, or the number of closed pores is larger. When the heat insulating performance of the filling member 300 is improved, heat transfer between the battery modules 100 is minimized, and thus, the ignition phenomenon in the battery pack 1 can be alleviated. Here, the filling member 300 may be provided of a material having heat insulating properties, but this is not always the case.

The filling member 300 may be formed through foaming work. In a specific example, the filling member 300 may be formed of urethane foam, and the urethane stock solution cany be injected by a foaming machine to form the filling member 300 having a porous structure.

The filling member 300 with a porous structure may be made of a thermal conductive material, a flame retardant material, an insulating material, a self-extinguishing material, a heat insulating material, or other various materials. For example, the filling member 300 may be formed of polyurethane foam. Because polyurethane foam decomposes by absorbing heat, thermal runaway and heat propagation in the battery pack 1 can be alleviated. At this time, the polyurethane foam included in the filling member 300 may be one to which expanded graphite is added, and the endothermic reaction of polyurethane foam to which expanded graphite is added is as follows.

Polyurethane foam→Melt(polyol)+Gas(Isocyanate): 1009 [J/g]

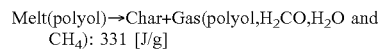

In another example, the porous filling member 300 may be formed of a thermal conductive material having excellent heat dissipation effect. In the porous filling member 300 formed of a thermal conductive material, heat dissipation of the battery module 100 may be achieved through the pore surface of the filling member 300, and the insulation between the battery modules 100 can be achieved through the space inside the pores of the filling member 300, whereby the safety of the battery module 100 can be further improved through the filling member 300.

Meanwhile, although not specifically mentioned above, the battery pack according to an embodiment of the present disclosure may further include a battery management system (BMS) and a cooling device that control and manage battery's temperature, voltage, and the like.

The battery pack according to an embodiment of the present disclosure can be applied to various devices. For example, the device to which the battery pack is applied can be a vehicle means such as an electric bicycle, an electric vehicle, or a hybrid vehicle. However, the above-mentioned device is not limited thereto, and the battery pack according to the present embodiment can be applied to various devices other than the examples described above, which also falls under the scope of the present disclosure.

Although preferred embodiments of the present disclosure have been shown and described above, the scope of the present disclosure is not limited thereto, and numerous other variations and modifications can be made by those skilled in the art using the basic principles of the invention defined in the appended claims, which also falls within the spirit and scope of the invention.

DESCRIPTION OF REFERENCE NUMERALS

100: battery module
200: pack frame
300: filling member

The invention claimed is:
1. A battery pack comprising:
a plurality of battery modules, each battery module including a battery cell stack in which a plurality of battery cells are stacked and a module frame for housing the battery cell stack, and
a pack frame for housing the at least one battery module,
wherein an empty space between the plurality of battery modules and the pack frame and an empty space between the battery modules are sealed by a filling member,
wherein the filling member is in contact with the plurality of battery modules and the pack frame, and
wherein the filling member is cured from a liquid in the pack frame.
2. The battery pack according to claim 1, wherein:
the plurality of battery modules is a first battery module and a second battery module,
the filling member is formed in a separated space between the first battery module and the second battery module, and
the filling member is in contact with each of the battery modules.
3. The battery pack according to claim 1, wherein:
the filling member comprises a thermal conductive material.
4. The battery pack according to claim 1, wherein:
the filling member comprises a flame-retardant material.

5. The battery pack according to claim 1, wherein:
the filling member comprises an insulating material.

6. The battery pack according to claim 1, wherein:
the filling member is formed of a material that is decomposed by an endothermic reaction.

7. The battery pack according to claim 1, wherein:
the filling member has a non-porous structure.

8. The battery pack according to claim 1, wherein:
the filling member has a porous structure.

9. The battery pack according to claim 8, wherein:
the filling member is made of a flame-retardant foam.

10. The battery pack according to claim 8, wherein:
the filling member is made of a polyurethane foam.

11. The battery pack according to claim 8, wherein:
the filling member is made of a polyurethane foam to which expanded graphite is added.

12. A device comprising the battery pack as set forth in claim 1.

13. The battery pack according to claim 1, wherein a height of the at plurality of battery modules is greater than a height of the filling member.

14. The battery pack according to claim 1, wherein a height of the plurality of battery modules is less than a height of the filling member.

15. The battery pack according to claim 1, wherein the plurality of battery modules are submerged in the liquid before curing.

* * * * *